(12) United States Patent
Jung et al.

(10) Patent No.: US 7,221,942 B2
(45) Date of Patent: May 22, 2007

(54) SYSTEM AND METHOD FOR PROVIDING A MESSENGER SERVICE CAPABLE OF CHANGING MESSENGER STATUS INFORMATION BASED ON A SCHEDULE

(75) Inventors: Ho-Won Jung, Suwon-si (KR);
Ho-Sub Seo, Gunpo-si (KR); Jee-Hoon Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 217 days.

(21) Appl. No.: 10/998,511

(22) Filed: Nov. 29, 2004

(65) Prior Publication Data
US 2005/0215252 A1    Sep. 29, 2005

(30) Foreign Application Priority Data
Mar. 26, 2004    (KR) .................... 10-2004-0020802

(51) Int. Cl.
*H04Q 7/20*    (2006.01)
(52) U.S. Cl. ................ 455/435.1; 455/414.2; 455/433
(58) Field of Classification Search ............. 455/435.1, 455/414.1, 414.2, 422.1, 433
See application file for complete search history.

(56) References Cited

U.S. PATENT DOCUMENTS

| | | | |
|---|---|---|---|
| 6,640,230 B1 | 10/2003 | Alexander et al. | |
| 2002/0049709 A1* | 4/2002 | Miyasaki et al. | 707/1 |
| 2003/0009530 A1 | 1/2003 | Philonenko et al. | |
| 2005/0148331 A1* | 7/2005 | Sharon et al. | 455/435.1 |
| 2005/0202836 A1* | 9/2005 | Schaedler et al. | 455/466 |
| 2005/0266859 A1* | 12/2005 | Tejani et al. | 455/456.4 |
| 2006/0142030 A1* | 6/2006 | Coskun et al. | 455/466 |

* cited by examiner

*Primary Examiner*—Temica Beamer
(74) *Attorney, Agent, or Firm*—The Farrell Law Firm

(57) ABSTRACT

A system and method for providing messenger services is disclosed. The system includes a presence information database (DB), a terminal, and messenger server. The presence information database (DB) stores messenger status information of each of a plurality of subscribers subscribing to the messenger services, and registration information shared between the subscribers. In response to a request of the first subscriber, the terminal stores a first subscriber's schedule therein, and transmits the first subscriber's stored schedule and a change request signal of messenger status. The messenger server receives the schedule and the change request signal of messenger status information based on the schedule and changes first subscriber's messenger status information in response to the schedule.

7 Claims, 5 Drawing Sheets

SYSTEM AND METHOD FOR PROVIDING A MESSENGER SERVICE CAPABLE OF CHANGING MESSENGER STATUS INFORMATION BASED ON A SCHEDULE

PRIORITY

This application claims priority to an application entitled "MESSENGER SERVICE PROVIDING SYSTEM AND METHOD CAPABLE OF CHANGING MESSENGER STATUS INFORMATION BASED ON SCHEDULE", filed in the Korean Intellectual Property Office on Mar. 26, 2004 and assigned Serial No. 2004-20802, the contents of which are hereby incorporated by reference.

BACKGROUND OF THE INVENTION

1. Field of the Invention

The present invention relates to a system for providing messenger service, and more particularly, to a system and method for providing a messenger service for indicating messenger status information of messenger service subscribers.

2. Description of the Related Art

Generally, a messenger service is frequently used for communicating and exchanging content between remote users through a communication network.

The messenger service provides messenger service subscribers with a function of indicating messenger status information together with communication functions, such as, message transmission, file sharing, chatting, video conference, etc., between the messenger service subscribers. Messenger status information of a subscriber indicates a current status of the subscriber using messenger service, for example, an on-line status showing that a subscriber is connected to a network, a temporarily away status showing that a subscriber has temporarily left his/her terminal, and a busy status showing that a subscriber is busy conducting other tasks, etc.

A messenger server stores subscriber messenger status information in real-time in order to provide the messenger status information of the subscribers. Here, each subscriber's messenger status information is selectively stored by the subscriber from among pre-determined messenger status information. The messenger server informs other subscribers, which have previously registered the subscriber in their contact lists, of the subscriber's stored messenger status information. Then, the other subscribers can recognize current status of the subscriber through the messenger status information.

However, the prior art method described above indicating messenger status information, cannot inform detailed status of a subscriber if there are relatively few messenger status records to choose from. Also, the prior art method has disadvantages that the messenger status information must be directly changed by the subscribers each time their status is changed.

SUMMARY OF THE INVENTION

Therefore, the present invention has been made in view of the above problems, and it is an object of the present invention to provide a system and method for providing a messenger service for automatically changing messenger status information of subscribers of messenger services based on individual schedules even if messenger status information is not changed by the subscribers each time their current status is changed.

In accordance with an aspect of the present invention, the above and other objects can be accomplished by the provision of a system for providing messenger services, including a presence information database (DB) for storing messenger status information of each of a plurality of subscribers of the messenger services, and registration information shared between the subscribers, a terminal for storing a first subscriber's schedule therein, and transmitting the first subscriber's stored schedule and a change request signal of messenger status, in response to a request of the first subscriber; and a messenger server for receiving the schedule and the change request signal of messenger status based on the schedule, changing first subscriber's messenger status information in response to the schedule, and transmitting the first subscriber's changed messenger status information to one or more second subscribers that have previously registered the first subscriber in their contact lists based on the registration information shared between the subscribers, which is stored in the presence information DB.

In accordance with another aspect of the present invention, there is provided a method for providing messenger services through a messenger server, including receiving a first subscriber's schedule and a change request signal of messenger status based on the first subscriber's schedule from a terminal of the first subscriber of the messenger services, and changing the first subscriber's messenger status information based on the first subscriber's schedule, and transmitting the first subscriber's changed messenger status information to one or more second subscribers that have previously registered the first subscriber in their contact lists based on registration information shared between the subscribers, which is stored in the presence information DB.

In accordance with yet another aspect of the present invention, there is provided a method for receiving messenger services in a terminal, including storing a schedule of a first subscriber of the messenger services, transmitting the stored schedule of the first subscriber to a messenger server, and receiving a user request for changing messenger status information of the first subscriber and generating a change request signal of messenger status information based on the schedule of the first subscriber if there is a request of the first subscriber, transmitting the change request signal to the messenger server together with the stored schedule of the first subscriber, changing the messenger status information of the first subscriber based on the schedule of the first subscriber in the messenger server, and transmitting the changed messenger status information of the first subscriber to one or more second subscribers that have previously registered the first subscriber in their contact lists.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
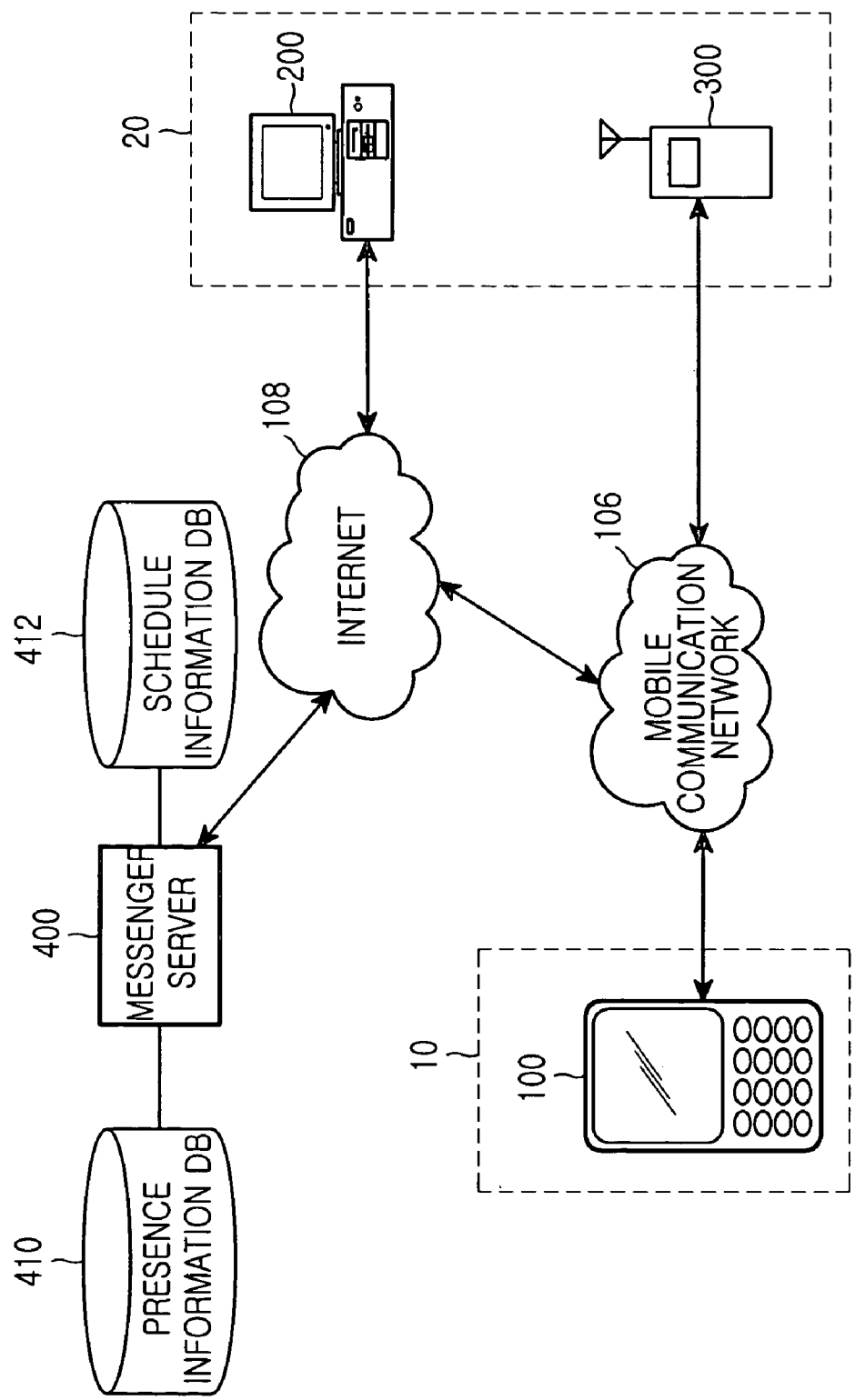
FIG. 1 is a block diagram of a messenger service providing system according to one embodiment of the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention unclear.

FIG. 1 is a block diagram of a messenger service system according to one embodiment of the present invention. As shown in the drawing, the system comprises terminals 10 and 20, as clients, a messenger server 400, a presence information DB (database) 410 and a schedule information DB 412.

The terminals 10 and 20 may comprise all kinds of terminals capable of providing messenger services, such as a PDA (Personal Digital Assistant) 100, a computer 200, a mobile communication terminal 300, and the like.

In accordance with one embodiment of the present invention, reference numeral 10 denotes a terminal corresponding to a first subscriber of the messenger service, (hereinafter referred to as a first subscriber's terminal), and reference numeral 20 denotes a terminal corresponding to a second subscriber (hereinafter referred to as a second subscriber's terminal) that has previously registered the first subscriber in a group. Here, the second subscriber's terminal 20 may be implemented as one or more terminals.

The first subscriber's terminal 10 stores a first subscriber's schedule. The first subscriber's schedule can be stored in the first subscriber's terminal by a schedule management program commonly used in a general terminal or a personal computer. If there is a change request of the first subscriber's messenger status information, the first subscriber's terminal 10, storing a first subscriber's schedule, generates a change request signal of messenger status based on the schedule. Also, the first subscriber's terminal 10 transmits a generated change request signal of messenger status according to the schedule and the first subscriber's stored schedule to the messenger server 400 through a mobile communication network 106 and the Internet 108.

The messenger server 400 provides messenger services to the terminals 10 and 20 connected to the Internet 108 if the messenger services are requested by these terminals.

The messenger server 400 stores presence information for providing messenger services to each of the terminals in the presence information DB 112. Specifically, the messenger server 400 stores subscriber user IDs and passwords, client IDs of terminals, as clients, used by subscribers, and session IDs showing that it is connected to terminals used by subscribers in a presence information DB 410. Also, the messenger server 400 stores each subscriber's messenger status information and registration information shared between the subscribers. Each subscriber's messenger status information shows the current status of each subscriber, and the registration information of each subscriber includes group list information related to a buddy list registered by each subscriber and contact information related to a connection status of each subscriber in the group list.

The messenger server 400 stores a first subscriber's schedule in the schedule information DB 412 if it receives' the first subscriber's schedule from the first subscriber's terminal 10 and a change request signal of a messenger status in response to the first subscriber's schedule. Also, in response to the first subscriber's schedule, the messenger server 400 changes the first subscriber's messenger status information stored in the presence information DB 410. The messenger server 400 transmits the first subscriber's changed messenger status information to at lease one or more second subscribers terminals 20 that have previously registered the first subscriber in their contact list via the Internet 108. Here, the messenger server 400 can recognize the one or more second subscriber terminals 20 that have previously registered the first subscriber in their contact lists through the presence information stored in the presence information DB 410. After the first subscriber's messenger status information is transmitted to the second subscriber terminals 20 that have previously registered the first subscriber in their contact lists, the messenger serve 400 transmits a signal indicating that the first subscriber's messenger status information was changed to the first subscriber's terminal 10. Therefore, the second subscriber terminals that have previously registered the first subscriber in their contact lists can recognize the first subscriber's messenger status information according to their schedule.

Figure 2:
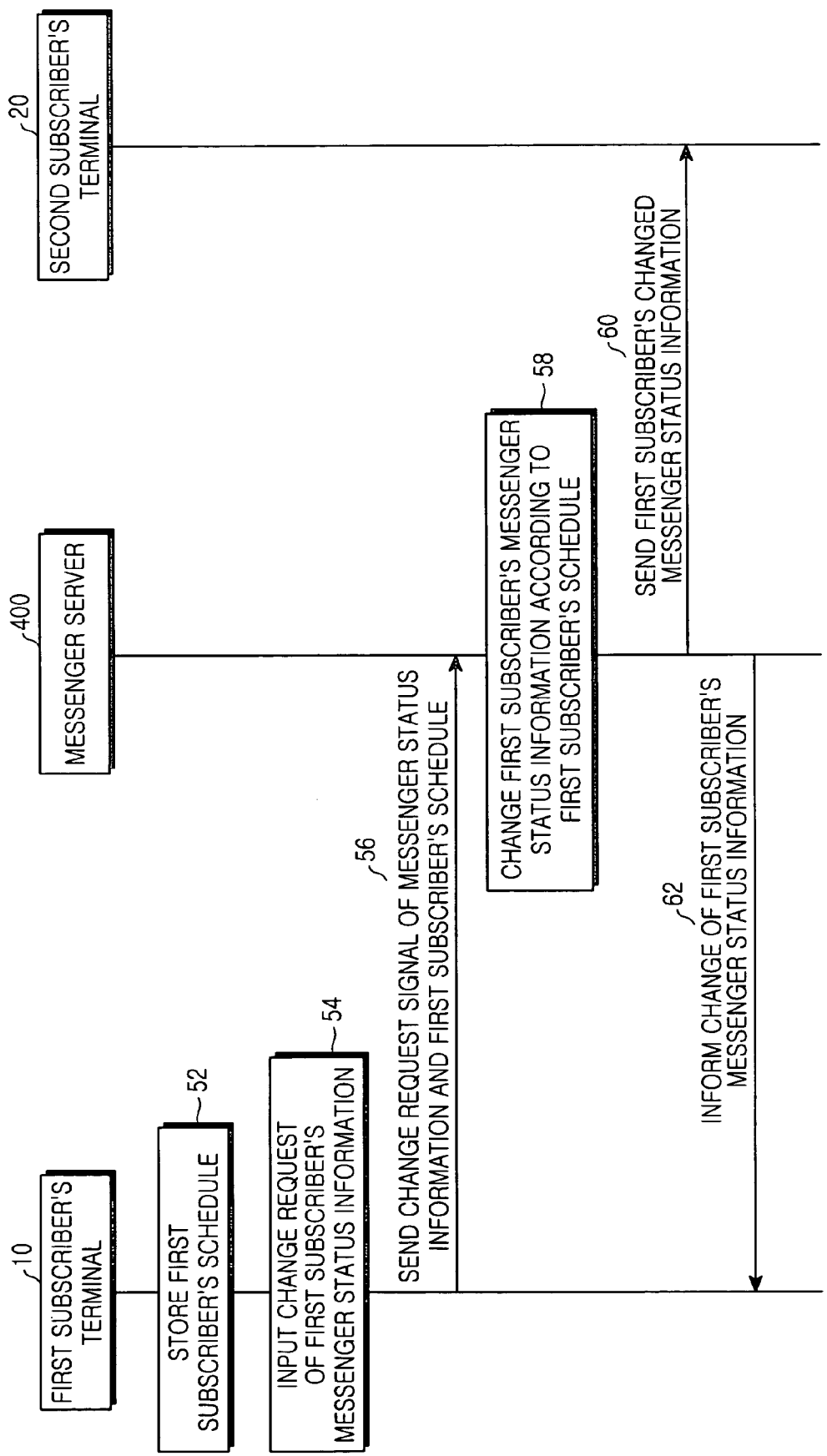
FIG. 2 is a view illustrating a procedure of providing messenger service according to the present invention.

FIG. 2 is a view illustrating a procedure of providing messenger services according to the present invention. With reference to FIGS. 1 and 2, a process for changing messenger status information according to one embodiment of the present invention will be described in detail below.

The first subscriber's terminal 10 stores a first subscriber's schedule at step 52. Here, the first subscriber can store the first subscriber's schedule in the first subscriber's terminal 10 by a schedule management program by. After storing the first subscriber's schedule, the first subscriber's terminal 10 inputs a change request signal of the first subscriber's messenger status at step 54. The first subscriber's terminal 10 generates a change request signal of messenger status information if, in response to the first subscriber's schedule, the change request signal of messenger status information is inputted from the first subscriber and then transmits the change request signals of the messenger status information to the messenger server 400 together with the first subscriber's schedule at step 56. Here, the change request signal of messenger status information is a signal for requesting that the first subscriber's messenger status information is changed according to the first subscriber's schedule.

If a first subscriber's schedule and a change request signal of messenger status information are received from the first subscriber's terminal 10, the messenger server 400 changes the first subscriber's messenger status information according to the first subscriber's schedule at step 58. Namely, if a first subscriber's schedule and a change request signal of messenger status information are received, the messenger server 400 stores the first subscriber's received schedule in the schedule information DB 412. Also, the messenger server 400 changes the first subscriber's messenger status information stored in the presence information DB 412 according to the stored schedule.

After changing the first subscriber's messenger status information, the messenger server 400 provides the first subscriber's changed messenger status information to the second subscriber's terminal 20 at step 60. Here, the second subscriber's terminal 20 is a terminal, or a client, corresponding to a second subscriber that has previously registered the first subscriber in a group, and may be implemented to include one or more terminals. The second subscriber's terminal 20 receives first subscriber's messenger status information, changed according to the first subscriber's schedule, from the messenger server 400, and informs the second subscriber of this. Therefore, the second subscriber can recognize in detail current status of the first subscriber.

In step 62, the messenger server 400 notifies the first subscriber's terminal 10 that the first subscriber's messenger status information was changed. Namely, the messenger server 400 transmits a change notification signal of the first subscriber's messenger status information to the first subscriber's terminal 10. Here, the change notification signal of the messenger status information includes information for notifying a change of the first subscriber's messenger status information and first subscriber's changed messenger status information. The first subscriber's terminal 10 receives the change notification signal of the messenger status information from the messenger server 400, and indicates that the first subscriber's messenger status information was changed according to the schedule. Therefore, the first subscriber does not need to change messenger status information each time his/her schedule changes.

Figure 3:
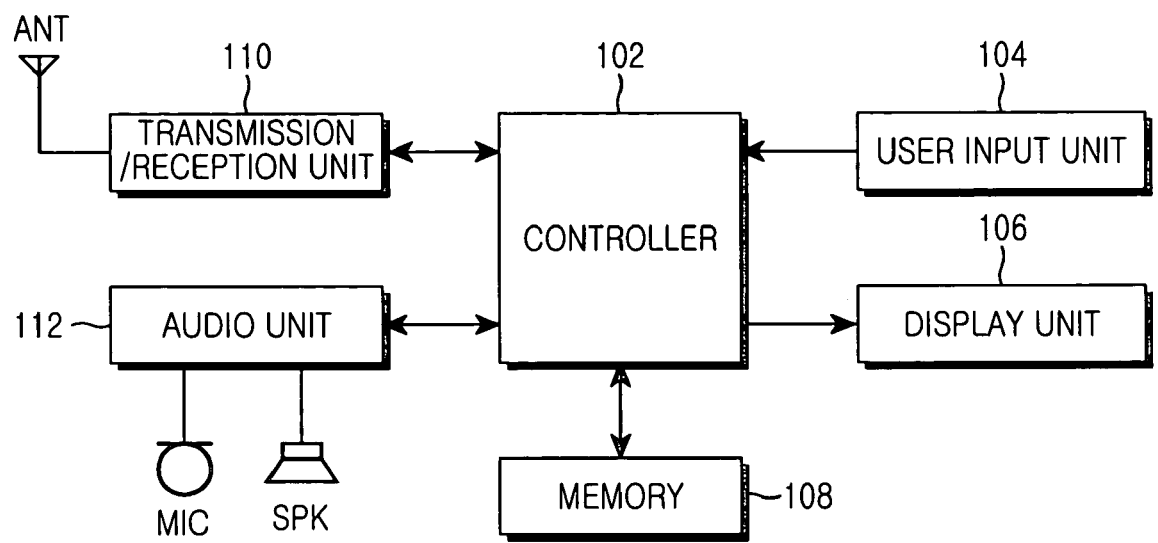
FIG. 3 is a block diagram of terminals according to the present invention.

FIG. 3 is a block diagram of terminals according to the present invention. With reference to FIG. 3, the construction and method of the terminals 10 and 20 will be described in detail below. First, if there is a change request of messenger status information according to a schedule, the controller 102 generates a change request signal of messenger status information according to a first subscriber's schedule and transmits it together with the first subscriber's schedule.

The memory 108 may include a ROM (Read Only Memory), a RAM (Random Access Memory) and the like, which are capable of storing a plurality of programs and data, and stores a messenger program for providing messenger services and data corresponding to subscriber's schedule according to the embodiment of the present invention.

The user input unit 104 may include a user input device such as a keypad, a touch panel, a keyboard etc. Such user input unit 104 transmits a subscriber's schedule stored in the memory 108 to the messenger server 400 (FIG. 1) to receive a user's request for changing the subscriber's messenger status information stored in the presence information DB 410 (FIG. 1). For example, the user input unit 104 includes a plurality of keys or buttons for outputting a change request (input) signal of messenger status information according to the subscriber's schedule corresponding to the key or button input, to the controller 102.

The transmission/reception unit 110 performs voice data and control data transmission/reception under control of the controlling unit 102. The transmission/reception unit 110 transmits a subscriber's schedule and a change request signal of messenger status information according to the subscriber's schedule to the messenger server 400 via the Internet 108 under the control of the controller 102.

The audio unit 112 converts audio data into an audio signal to output it to a speaker SPK under control of the controller 102, and converts an audio signal input through a microphone MIC into electrical data to output it to the controller 102.

The display unit 106 may be implemented in the form of a LCD (Liquid Crystal Display) etc., and outputs various kinds of display data for messenger services according to the present invention.

Figure 4:
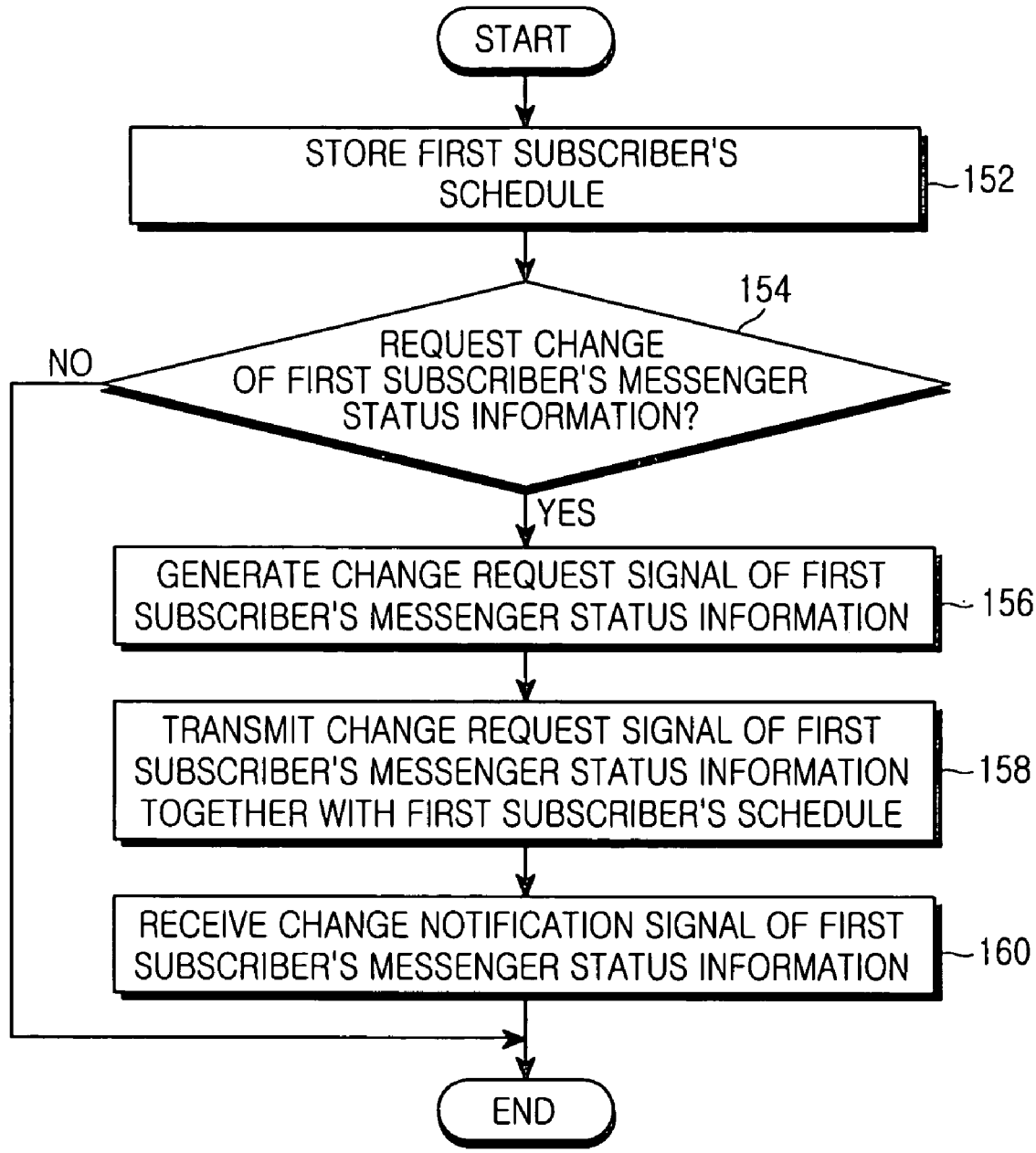
FIG. 4 is a flow chart illustrating a process of requesting a change of a subscriber's messenger status information in a terminal according to the present invention.

FIG. 4 is a flow chart illustrating a process of requesting a change of subscriber's messenger status information in a terminal in accordance with the present invention. With reference to FIGS. 1, 3 and 4, a request process for changing first subscriber's messenger status information in the first subscriber's terminal 10 according to the present invention will be described in detail below.

At step 152, the controller 102 of the first subscriber's terminal 10 inputs a first subscriber's schedule, adopted to first subscriber's messenger status information from the first subscriber, for storing it in the memory 108. Here, the first subscriber's schedule can be inputted and stored by a general schedule management program. An exemplary first subscriber's schedule inputted and stored by the schedule management program is illustrated in Table 1.

TABLE 1

| 09:00~10:00 | Meeting |
| 10:00~12:00 | Watching a movie |
| 13:00~14:00 | Having lunch |

After storing the first subscriber's schedules based on time block in the memory 108, the controller 102 determines at step 154 whether there is a change request signal of messenger status information according to the first subscriber's schedule. If the change request signal of first subscriber's messenger status information according to the first subscriber's schedule is inputted through the user input unit 104, at step 156 the controller 102 generates a change request signal of the first subscriber's messenger status information. At step 158, the controller 102 transmits the change request signal of first subscriber's messenger status information to the messenger server 400 together with the first subscriber's schedule stored in the memory 108. Namely, after reading the first subscriber's schedule stored in the memory 108, the controller 102 transmits the fist subscriber's schedule and a change signal of first subscriber's messenger status information to the messenger server 400 connected to the Internet 108. After transmitting the first subscriber's schedule and the change signal of the first subscriber's messenger status information to the messenger server 400, at step 160, the controller 102 receives a change notification signal of the first subscriber's messenger status information from the messenger server 400. The controller 102 displays information notifying change of the first subscriber's messenger status information included in the received change notification signal of the first subscriber's messenger status information and the first subscriber's messenger status information on the display unit 106, or outputs them as an audio signal through the audio unit 112 to notify the first subscriber that the messenger status information was changed according to the schedule.

Figure 5:
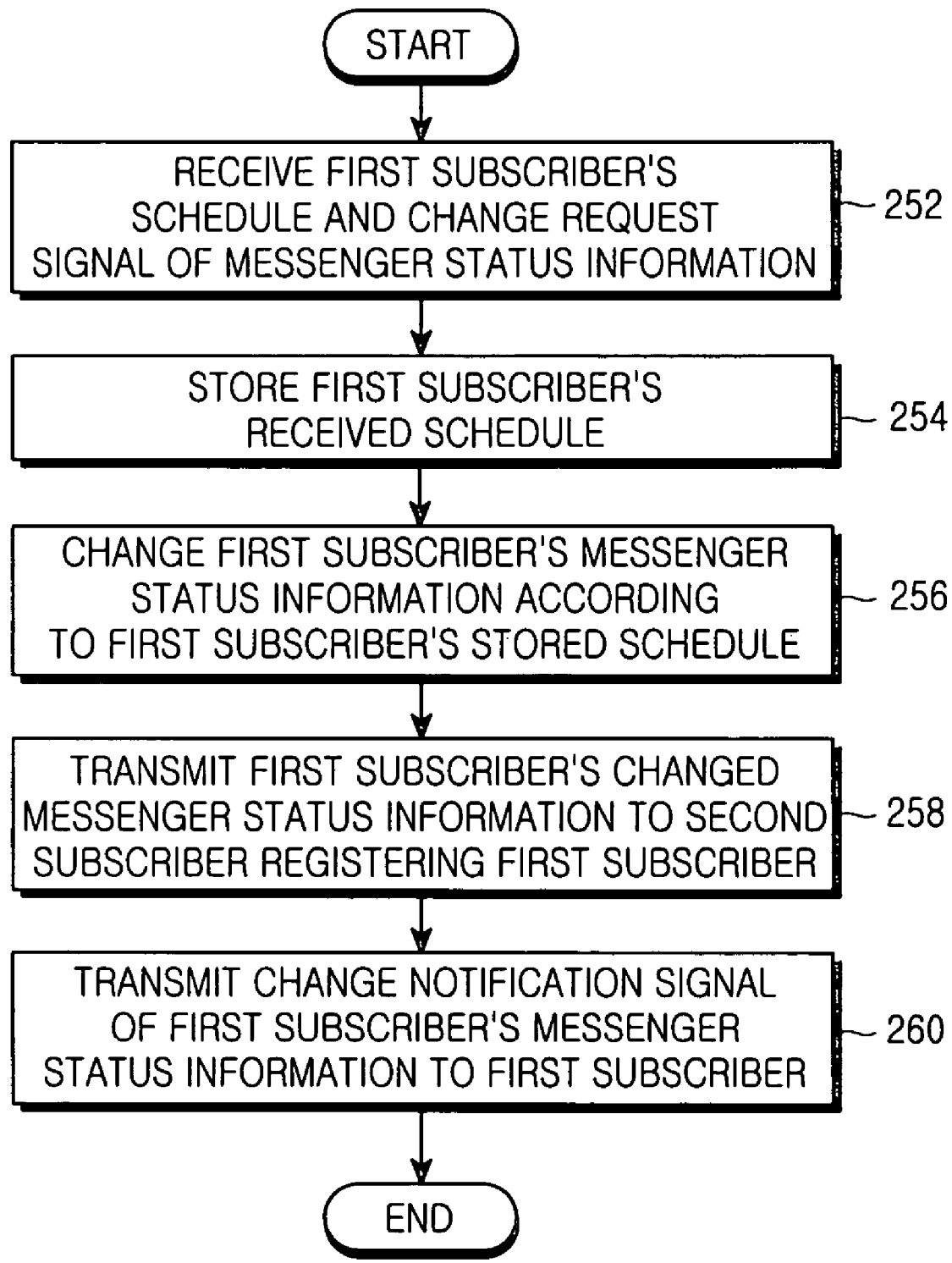
FIG. 5 is a flow chart illustrating a process of indicating messenger status change based on a subscriber's schedule in a messenger server according to the present invention.

FIG. 5 is a flow chart illustrating a process of indicating messenger status change based on a subscriber's schedule in a messenger server according to the present invention. With reference to FIGS. 1 and 5, the method by which the messenger server 400 changes messenger status information according to the first subscriber's schedule to notify the first and second subscriber's terminals 10 and 20 of the change, will be described in detail below.

At step 252, the messenger server 400 receives a first subscriber's schedule and a change request signal of messenger status information. For example, the messenger server 400 receives the schedule and the change request signal of messenger status information shown in Table 1 from the first subscriber's terminal 10 via the Internet 108. As step 254, the messenger server 400 stores the first subscriber's schedule in the schedule information DB 412. After storing the first subscriber's received schedule, at step 256, the messenger 400 changes the first subscriber's messenger status information according to the first subscriber's schedule stored in the schedule information DB 412.

For example, considering the first subscriber's schedule stored in the schedule information DB 412, shown in Table 1, the messenger server 400 changes the first subscriber's messenger status information stored in the presence DB 410 to a status of "Meeting" when the current time is "09:00"; "Watching a movie" when the current time is "10:00"; and "Having a lunch" when the current time is "13:00." The messenger server 400 may change messenger status information to predetermined messenger status information previously set therein or selected by a user when there is nothing scheduled at the present time, such as when the current time is "12:00" in Table 1.

After changing the first subscriber's messenger status information, at step 258, the messenger server 400 transmits the first subscriber's changed messenger status information to the second subscriber terminals 20 that have previously registered the first subscriber in their contact lists. Namely, after changing the first subscriber's messenger status information, the messenger server 400 recognizes one or more second subscribers 20 that have previously registered the first subscriber in their contact lists through registration information stored in the presence information DB 410 and transmits the first subscriber's changed messenger status information to each of the second subscribers' terminals 20. Each of the second subscribers' terminals 20 receives the first subscriber's changed messenger status information according to the first subscriber's schedule from the messenger server 400, and informs the second subscribers of this. Accordingly the second subscribers can recognize the current status of the first subscriber in detail.

The messenger 400 transmits a change notification signal of first subscriber's messenger status information to the first subscriber's terminal 10 at step 260. Namely, the messenger server 400 transmits information indicating that first subscriber's messenger status information was changed and a change notification signal of messenger status information including the first subscriber's changed messenger status information to the first subscriber's terminal 10 via the Internet 108. The first subscriber's terminal 10 receives the change notification signal and notifies the first subscriber of information indicating change of the first subscriber's messenger status information and the first subscriber's changed messenger status information. Accordingly, the first subscriber does not need to change messenger status information each time their status is changed, instead their messenger status information can be automatically changed according to their schedule.

As apparent from the above description, the present invention can automatically change subscriber's messenger status information according to a subscriber's schedule, therefore a messenger service subscriber does not need to change messenger status information each time their current status is changed. Also, the present invention can automatically change subscriber's messenger status information according to the subscriber's schedule, therefore it can correctly and specifically indicate current status of a messenger service subscriber.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for providing messenger services, comprising:
   a presence information database (DB) for storing messenger status information of each of a plurality of subscribers subscribing to the messenger services, and registration information between the subscribers;
   a terminal for storing a first subscriber's schedule therein, and transmitting the first subscriber's stored schedule and a change request signal of messenger status, in response to a request of the first subscriber; and
   a messenger server for receiving the schedule and the change request signal of the messenger status based on the schedule, changing the first subscriber's messenger status information in response to the schedule, and transmitting the first subscriber's changed messenger status information to one or more second subscribers that have previously registered the first subscriber in their contact lists based on the registration information between the subscribers, which is stored in the presence information DB.

2. The system of claim 1, wherein said registration information between the subscribers includes:
   group information of each of the plurality of the subscribers subscribing to the messenger services; and
   contact information of each of the plurality of the subscribers in the group information.

3. The system of claim 2, further comprising a schedule information database (DB) for storing the first subscriber's schedule received in the messenger server.

4. The system of claim 1, wherein said terminal includes:
   a memory for storing the first subscriber's schedule;
   a user input unit for transmitting the first subscriber's schedule stored in the memory to the messenger server, and inputting a user request for changing the first subscriber's messenger status information stored in the presence information DB;
   a transmission/reception unit for transmitting the first subscriber's schedule and the change request signal of the messenger status based on the first subscriber's schedule to the messenger server; and
   a controller for generating the change request signal of the messenger status based on the first subscriber's schedule if there is a request of the first subscriber from the user input unit, and confirming that the change request signal of the messenger status is transmitted through the transmission/reception unit together with the first subscriber's schedule stored in the memory.

5. A method for providing messenger services through a messenger server, comprising the steps of:
   receiving a first subscriber's schedule and a change request signal of messenger status based on the first subscriber's schedule from a terminal of the first subscriber of the messenger services; and
   changing first subscriber's messenger status information based on the first subscriber's schedule, and transmitting the first subscriber's changed messenger status information to one or more second subscribers that hase previously registered the first subscriber in their contact lists based on registration information between the subscribers, which is stored in the presence information DB.

6. The method of claim 5, wherein changing said step includes:
   storing the first subscriber's schedule in a schedule information DB;
   changing the first subscriber's messenger status information stored in the presence DB in response to the first subscriber's schedule stored in the schedule information DB; and
   transmitting the first subscriber's changed messenger status information to one or more second subscribers that have previously registered the first subscriber in their lists based on registration information between the subscribers, which is stored in the presence information DB.

7. A method for receiving messenger services in a terminal, comprising the steps of:
   storing a schedule of a first subscriber of the messenger services;
   transmitting the stored schedule of the first subscriber to a messenger server;
   receiving a user request for changing messenger status information of the first subscriber;
   generating a change request signal of messenger status based on the schedule of the first subscriber if there is a request of the first subscriber;
   transmitting the change request signal to the messenger server together with the stored schedule of the first subscriber;
   changing the messenger status information of the first subscriber based on the schedule of the first subscriber in the messenger server; and
   transmitting the changed messenger status information of the first subscriber to one or more second subscribers that have previously registered the first subscriber in their lists.

* * * * *